(12) United States Patent
Tunstall et al.

(10) Patent No.: US 9,842,391 B2
(45) Date of Patent: Dec. 12, 2017

(54) METHOD AND APPARATUS FOR PROCESSING AN IMAGE OF A TISSUE SAMPLE

(71) Applicant: PATHXL LIMITED, Belfast (GB)

(72) Inventors: Jonathon Tunstall, Belfast (GB); Peter Hamilton, Belfast (GB); Yinhai Wang, Belfast (GB); David McCleary, Belfast (GB); James Diamond, Belfast (GB)

(73) Assignee: PATHXL LIMITED, Belfast (GB)

( * ) Notice: Subject to any disclaimer, the term of this patent is extended or adjusted under 35 U.S.C. 154(b) by 137 days.

(21) Appl. No.: 14/942,593

(22) Filed: Nov. 16, 2015

(65) Prior Publication Data

US 2016/0070949 A1 Mar. 10, 2016

Related U.S. Application Data

(63) Continuation-in-part of application No. PCT/GB2014/051427, filed on May 9, 2014.

(30) Foreign Application Priority Data

May 14, 2013 (GB) .................................. 1308664.0
Sep. 2, 2013 (GB) .................................. 1315597.3
Sep. 23, 2015 (GB) .................................. 1516869.3

(51) Int. Cl.
*G06K 9/00* (2006.01)
*G06T 7/00* (2017.01)

(52) U.S. Cl.
CPC .......... *G06T 7/0012* (2013.01); *G06K 9/0014* (2013.01); *G06K 9/00127* (2013.01);
(Continued)

(58) Field of Classification Search
CPC ......... G06T 7/0012; G06T 2207/10056; G06T 2207/30024; G06T 2207/30096;
(Continued)

(56) References Cited

U.S. PATENT DOCUMENTS

2006/0045320 A1 3/2006 Wetzel et al.

FOREIGN PATENT DOCUMENTS

GB 2463141 A 3/2010
WO 03105675 A2 12/2003
(Continued)

OTHER PUBLICATIONS

Great Britain Search Report for Application No. GB1315597.3 dated Feb. 24, 2014.
(Continued)

*Primary Examiner* — Shefali Goradia

(57) ABSTRACT

A computer implemented method is provided for determining an amount of tumor cells in a tissue sample. The method includes obtaining first image data describing an image of a tissue sample at a first resolution, obtaining second image data describing the image at a second resolution, wherein the first resolution is lower than the second resolution, selecting a candidate tumor region from the second image data based on texture data determined from the first image data, identifying a tumor structure in the candidate region of the second image data, and determining a number of cells in the tumor structure based on its area and an estimate of tumor cell area to estimate an amount of tumor cells in the tissue sample.

9 Claims, 8 Drawing Sheets

(52) U.S. Cl.
CPC ............... *G06K 9/00147* (2013.01); *G06T 2207/10056* (2013.01); *G06T 2207/30024* (2013.01); *G06T 2207/30096* (2013.01); *G06T 2207/30242* (2013.01)

(58) Field of Classification Search
CPC ...... G06T 2207/30242; G06K 9/00127; G06K 9/0014; G06K 9/00147
See application file for complete search history.

(56) References Cited

FOREIGN PATENT DOCUMENTS

| WO | 03106157 | A3 | 12/2003 |
|----|----------|----|---------|
| WO | 2004025569 | A3 | 3/2004 |
| WO | 2010027476 | A1 | 3/2010 |
| WO | 2012032173 | A1 | 3/2012 |
| WO | 2013049153 | A3 | 4/2013 |

OTHER PUBLICATIONS

Written Opinion for Application No. PCT/GB2014/051427 dated Apr. 20, 2015.

Gurcan M N et al: "Histopathological Image Analysis: A Review", IEEE Reviews in Biomedical Engineering, IEEE, USA, vol. 2, Jan. 1, 2009 (Jan. 1, 2009), pp. 147-171, XP011507549.

Halama N et al: "Estimation of Immune Cell Densities in Immune Cell Conglomerates: An Approach for High-Throughput Quantification", PLOS ONE. Public Library of Science, US, vol. 4. No. 11, Dec. 1, 2010 (Dec. 1, 2010), pp. e7847.1-e7847.6, XP002691992, Retrieved from the Internet: <http://www.plosone.orgjarticlejinfo%3Adoi%2F10.1371%2Fjournal.pone.0007847>, [retrieved on Nov. 16, 2009].

International Search Report for Application No. PCT/GB2014/051427 dated Apr. 20, 2015.

Ezequiel Geremia et al: "Brain Tumor Cell Density Estimation from Multi-modal MR Images Based on a Synthetic Tumor Growth Model",Oct. 5, 2012 (Oct. 5, 2012), Medical Computer Vision. Recognition Techniques and Applications in Medical Imaging,Springer Berlin Heidelberg, Berlin, Heidelberg, pp. 273-282.

Prior Fred W et al: "Predicting a multi-parametric probability map of active tumor extent using random forests", The Effect of Applied Compressive Loading on Tissue-Engineered Cartilage Constructs Cultured With TGF-BETA3, IEEE, Jul. 3, 2013 (Jul. 3, 2013), pp. 6478-6481.

METHOD AND APPARATUS FOR PROCESSING AN IMAGE OF A TISSUE SAMPLE

CROSS-REFERENCE TO RELATED APPLICATION

The present application is a continuation in part of International Application No. PCT/GB2014/051427 filed May 9, 2014, which claims priority from both UK Application No. GB1308664.0 filed May 14, 2013, and UK Application No. GB1315597.3 filed Sep. 2, 2013, all of which are incorporated herein by reference. The present application also claims priority from UK Application No. GB1516869.3 filed Sep. 23, 2015, the disclosure of which is hereby incorporated herein by reference.

TECHNICAL FIELD

The present invention relates to image processing, in particular to systems, methods, apparatus, computer program products and servers for processing an image of a tissue section of a tissue sample to analyse and identify a tumor region of a tissue sample for the purpose of macrodissection of the tissue sample.

BACKGROUND

The accurate separation of tumor tissue from non-tumor tissue is a prerequisite for laboratory molecular analysis of many types of tumor tissues.

In standard laboratory practice, tumor tissue for analysis is obtained by cutting a thin tissue section from a formalin fixed, paraffin embedded (FFPE) tissue block known to contain tumor and non-tumor tissue, and preparing the tissue section on a glass histology slide. The tissue section will usually be cut with a thickness of 10-40 μm to allow the outline of tissue structures to be made out by viewing the slide under a standard laboratory microscope.

In order to determine a boundary of a tumor region of a tissue section, it has been proposed to prepare a histology slide with the tissue section, comprising staining the tissue section with a laboratory dye and covering with a glass cover slip according to standard laboratory practice, for viewing and analysis by a trained pathologist.

A method of marking tumor regions of the tissue section comprises the pathologist viewing the slide using a standard laboratory microscope and, based on subjective assessment, for example based on memory or on visual comparison with a look-up chart, identifying regions of the tissue section appearing to correspond to model tumor structures, and indicating boundaries of the regions via a manual annotation with a marker pen on the glass coverslip. Following annotation, a sequential tissue section, preferably having a thickness in the range indicated above, can be cut from the tissue block for further testing.

It is often desirable to test tissue samples to identify the type of a cancerous or other pathological tissue that may be present. The sensitivity of these tests may depend upon the relative and absolute quantity of cancerous or pathological tissue in the sample, for example the number and percentage of tumor cells in the tissue. This is a complex evaluation, as there are many cell types within a given tissue sample and even in regions of the sample which are predominantly tumor, a mixture of non-tumor and normal cells can be found.

Such is the complexity of the pathology image, this task is normally carried out subjectively by an experienced pathologist who visually estimates the % tumor cells within the sample or within a defined region of the sample. This visual estimation can be highly inaccurate

SUMMARY

Aspects and examples of the present disclosure are set out in the claims. Some aspects of the disclosure aim to provide a method to generate objective, reproducible measurements of tumor cell populations based on digital images of tissues using computerised image analysis.

Some embodiments of the disclosure aim to provide multi-resolution analysis of high resolution microscopic images. Other embodiments of the disclosure aim to provide object-based tissue segmentation for tumor region identification. Other embodiments of the disclosure aim to provide tumor cell size averaging for large scale tumor cell number estimation. These embodiments may be employed independently, or in combination.

BRIEF DESCRIPTION OF DRAWINGS

Embodiments of the disclosure will now be described, by way of example only, with reference to the accompanying drawings in which.

SPECIFIC DESCRIPTION

Some embodiments of the disclosure are directed towards identifying the relative number of cells in a sample, or in a region of a sample for example within a boundary, that can be classified as tumor.

Based on this determination, a decision can be made to dissect the region from the sample, or to dissect a larger region, or not to dissect the sample at all, prior to testing the sample to identify the type of cancer cells that may be present in the sample.

Figure 1:
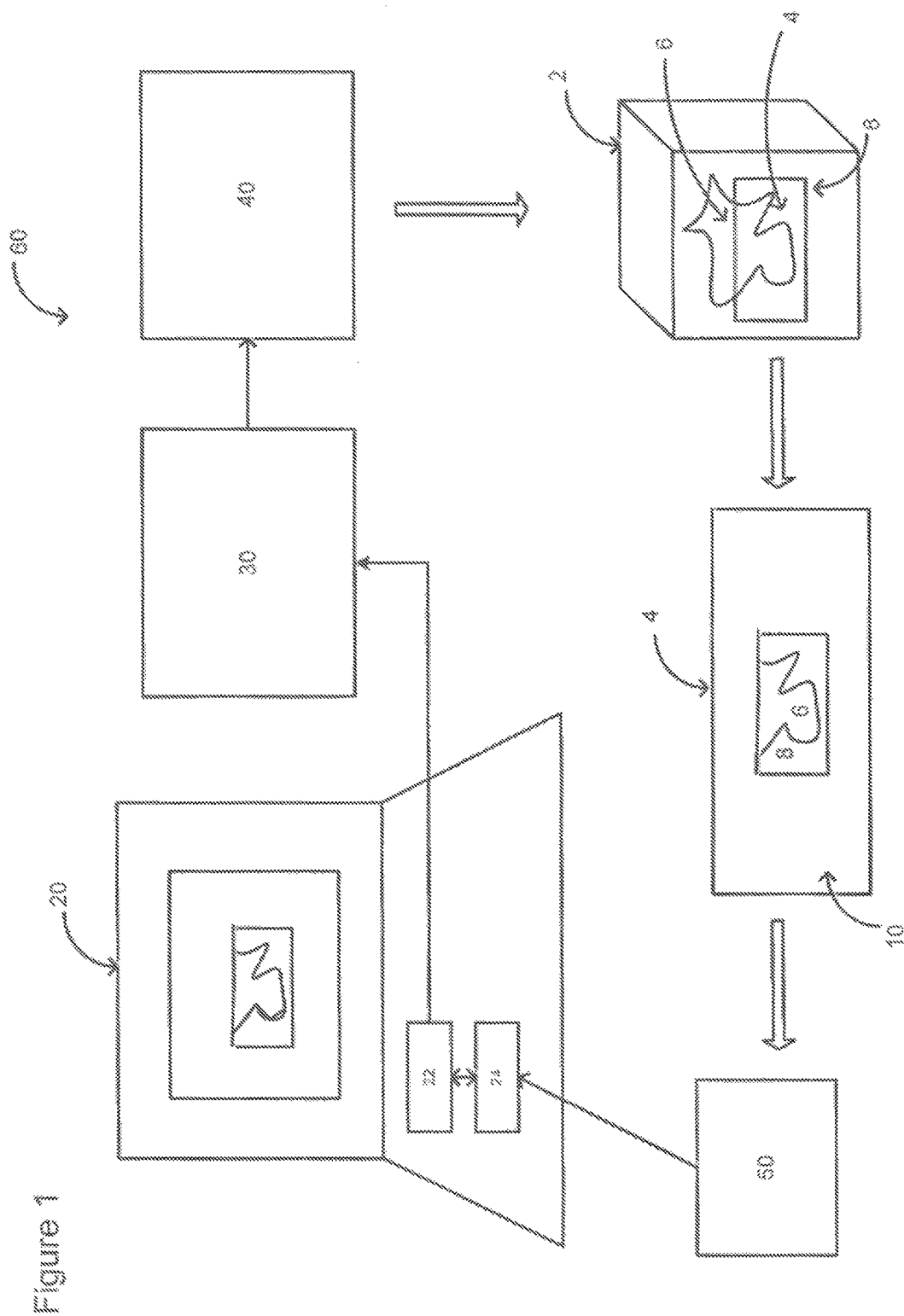
FIG. 1 shows a schematic illustration of a macrodissection system for excising tumor tissue from a tissue sample.

FIG. 1 shows a macrodissection system 60, comprising a tissue sample 2, a histology slide 10 carrying a tissue section 4 taken from the tissue sample 2, an imager 50, a computer 20, a controller 30, and a cutting device 40.

The imager 50 is arranged to obtain a digital image of the tissue section 4 on the histology slide 10 and to provide data representing the image to the computer 20. The computer 20 is configured to receive the data from the imager 50, to run an algorithm on the data to generate a result, and to provide the result to the controller 30 for controlling, guiding or initiating a cutting operation.

The tissue sample 2 comprises a formalin fixed, paraffin embedded tissue block suspected of containing at least one tumor region 6, and containing non-tumor regions 8. Tumor regions, such as the tumor schematically illustrated by region 6, are tissue regions containing abnormal patterns of growth, which may include, but are not limited to, any of dysplasia, neoplasia, carcinoma in-situ and cancerous tissue or any combination thereof. The non-tumor regions 8 may also contain tumor tissue, but in a lower concentration than present in their tumor regions 6.

The tissue section 4 is a section cut from the tissue sample 2, having a thickness in the range of 10 to 40 μm, although the skilled practitioner will understand that another thickness could be chosen as appropriate. The histology slide 10 is a standard glass laboratory slide or any suitable equivalent for providing a light transmissive surface for receiving and displaying the tissue section 4 to the imager 50.

The imager 50 is configured to generate an image of the tissue section 4 on the histology slide 10 and to provide data representing the image to computer 20. The imager comprises any suitable image generating means such as digital slide scanning systems whereby images are reconstructed following acquisition of multiple image tiles, or image lines, or an analogue or digital camera.

The computer 20 comprises memory 24 and a processor 22. The memory 24 is configured to receive and store data from the imager 50. The processor 22 is coupled to access image data stored in the memory 24, to implement an image processing algorithm on the data to classify a region of the image as a tumor region and identify the relative number of tumor cells and non-tumor cells in a sample, or a part of the sample.

Figure 2:
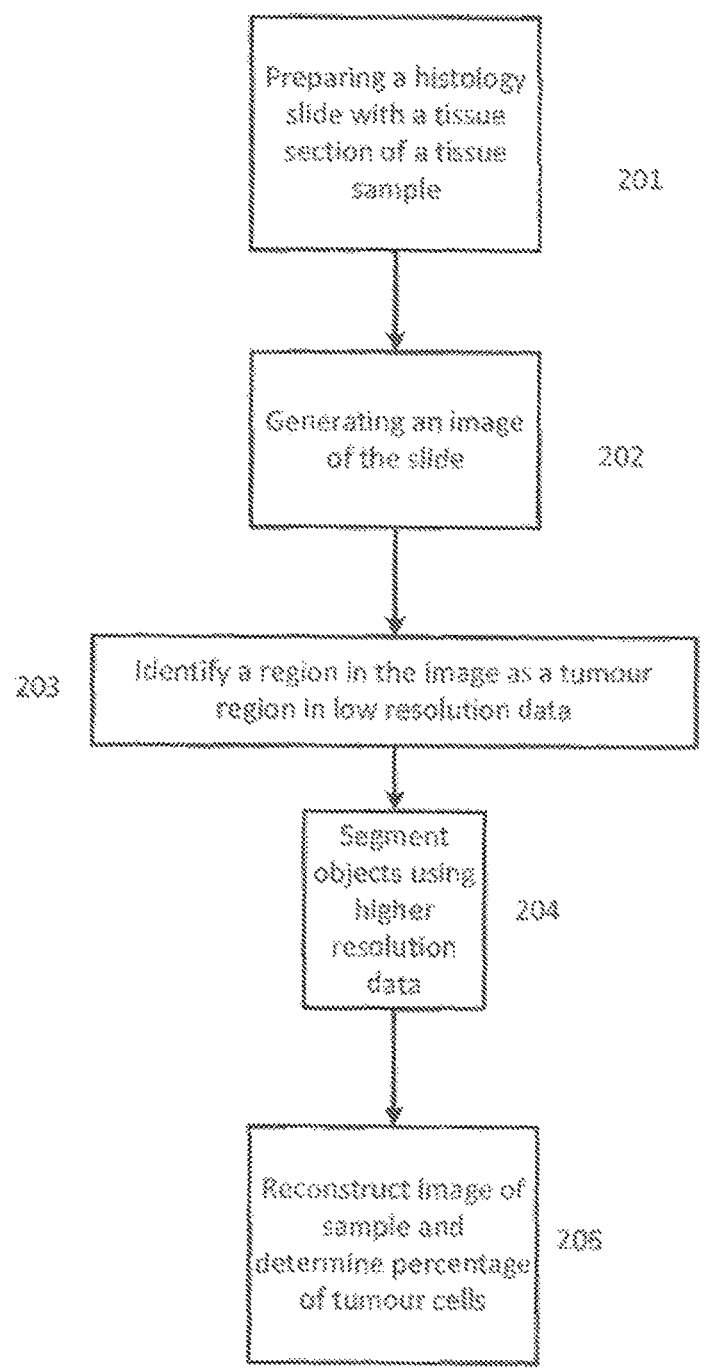
FIG. 2 shows a flow chart illustrating a method of using the macrodissection system of FIG. 1.

FIG. 2 illustrates a method comprising preparing 201 a tissue sample, and generating 202 an image of the slide. The image data is stored into memory 24 for later retrieval.

The processor 22 obtains the image data, and identifies 203 based on a low resolution image regions which may relate to tumor tissues. Using the regions identified in the low resolution data as a guide, the processor 22 segments 204 objects from higher resolution image data. The processor 22 then compares the objects with a data model (e.g. classification data, as described below) to determine the type of the objects, for example whether they relate to known tissue structures, or relate to tumor tissue structures.

Once the objects have been classified, the processor may define boundaries of the objects for example as discussed below with reference to FIG. 5. The processor then reconstructs 206 the image based on the known locations of the tissue (non-tumor) regions, and the tumor objects identified by the segmentation 204.

The processor 22 obtains an estimate of the size of a tumor cell, and an estimate of the size of a non-tumor cell, and determines the percentage number of tumor cells in the reconstructed image based on the area of the tumor objects, the area of the non-tumor regions, and the tumor and non-tumor cell areas.

Figure 3:
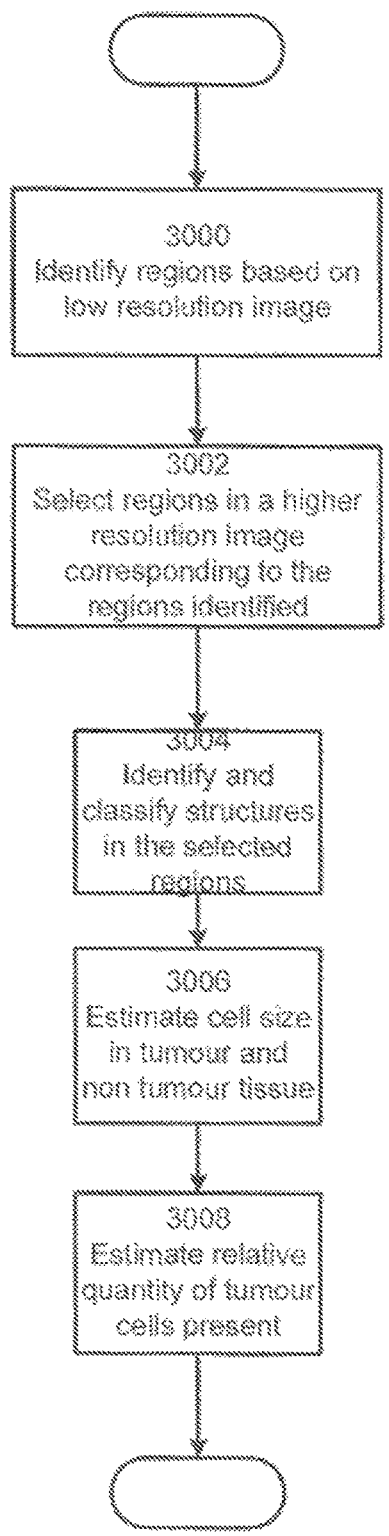
FIG. 3 shows a flow chart illustrating a method of using the macrodissection system of FIG. 1.

An example of this method is illustrated by the flow chart in FIG. 3.

The processor 22 obtains image data at a first resolution, and defines candidate regions in the image data at the first resolution which may relate to tumor tissues. The candidate regions may be defined based on their texture, or another image property such as the size and/or location of objects. The regions may be defined according to the method described with reference to FIG. 5 below.

The processor 22 then obtains second image data corresponding to the defined candidate regions. The second image data has a higher resolution than the first resolution.

The processor then identifies 3004 objects in the candidate region, for example using an object based segmentation, as described below with reference to FIG. 4. This identifies objects as tumor objects in the second (higher resolution) image.

The processor then estimates 3006 the area of a tumor cell by selecting regions of image data at native resolution corresponding to the objects identified as tumors. The regions selected can be selected at random (in Monte-Carlo fashion) from image data corresponding to identified tumor objects. The cell count in these selected regions (which may be a subset, e.g. less than all) of the tumor objects, is then used by the processor to determine an estimate of the area of a tumor cell.

As an example, cell count can be estimated based on nuclear segmentation and object counting. This can provide an estimate of cell numbers per unit area which can be used (e.g. scaled based on area) to extrapolate the estimate of cell number per unit area to estimate the number of cells in a given area, e.g. an entire tumor area.

A similar approach can be used to determine the area of a non-tumor cell.

Based on the known area of the tumor and non-tumor tissues, and the estimated cell area, the processor 22 estimates 3008 the total number of tumor cells and/or the relative quantity of tumor and non-tumor cells present in the sample.

Figure 4:
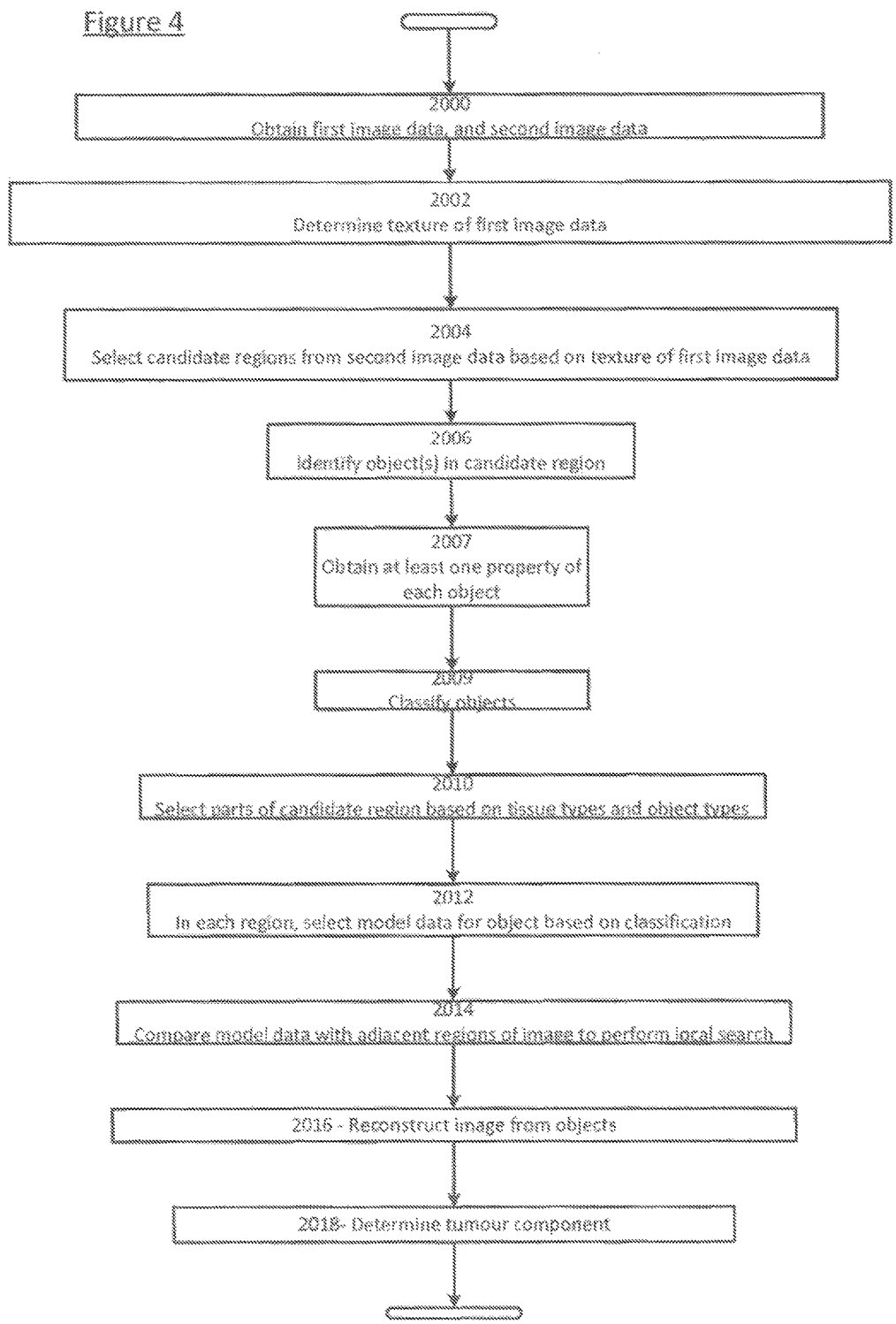
FIG. 4 shows a flow chart illustrating a method of using the macrodissection system of FIG. 1.
Figure 6:
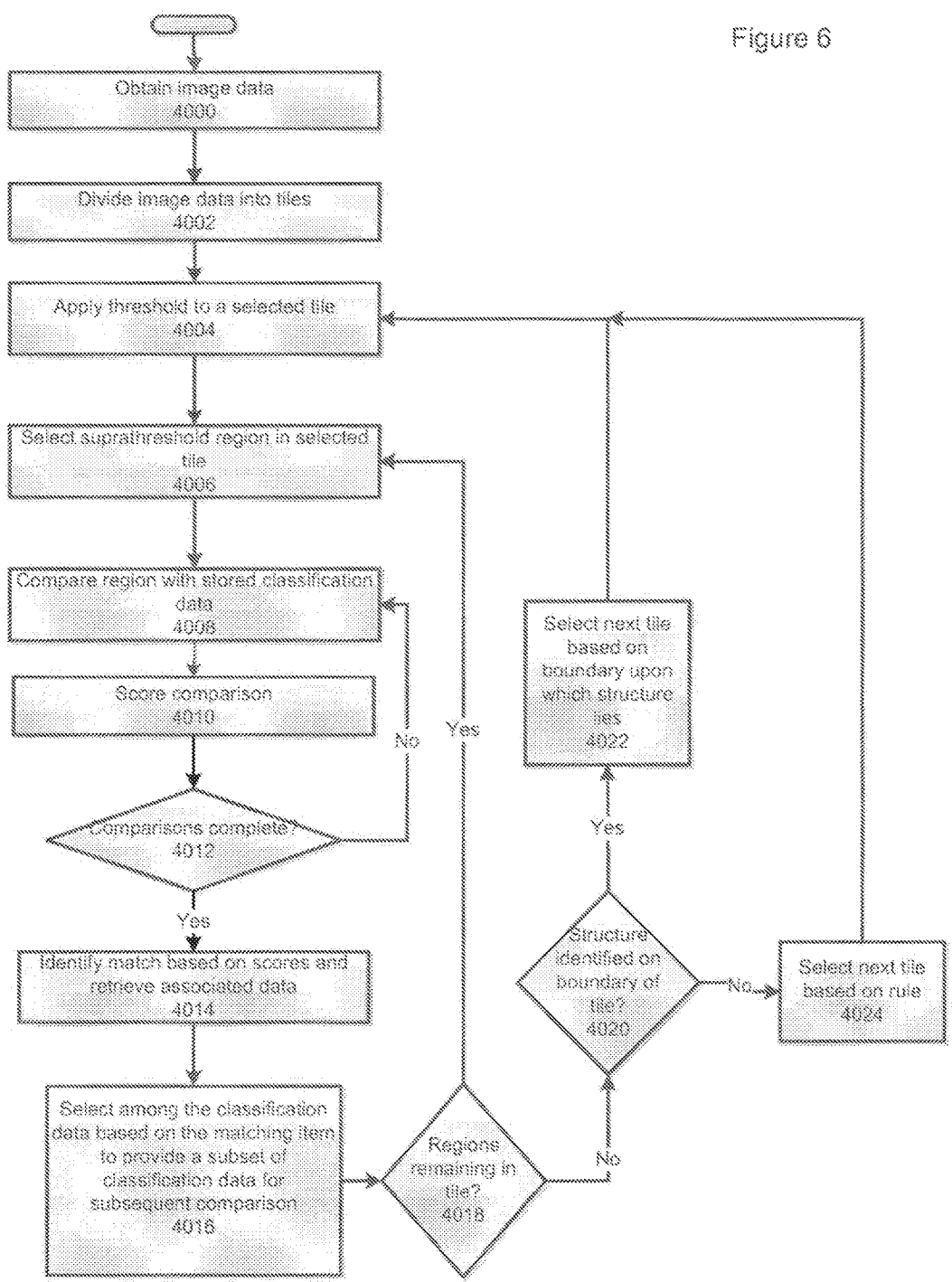
FIG. 6 illustrates a method of identifying structures such as may be used in the methods illustrated in FIG. 3, FIG. 4, or FIG. 5.

FIG. 4 illustrates one such method in more detail, and FIG. 6 illustrates a related method which may be used to identify structures in an image.

As shown in FIG. 4, the processor 22 obtains a first image dataset based on an image of a tissue sample, and a second image dataset based on the same sample where the second data set is at higher resolution than the first.

The processor 22 selects a threshold to apply the image data that divides the data into two groups. The processor is configured to select a threshold that reduces, for example minimises, the variance of the data values within each group. The processor 22 then applies the threshold value to the image data to generate a mask. The processor then applies the mask to segment the image data into two groups, tissue, and background.

The processor 22 then selects a region of tissue from the first image dataset (low resolution) and determines the grey level co-occurrence matrix of the first image dataset to provide an indication of the texture of the low resolution data. The low resolution texture data is subdivided into regions and compared with data based on the first image data, and comparing the texture data with classification data to identify candidate tumor regions or as non-tumor regions.

The processor 22 then selects 2004 a candidate tumor region from the second image data based on this comparison.

The processor 22 then identifies types of tissue and types of objects in the candidate region according to steps 2006, 2007, 2008, 2009 as described below.

To identify objects in the candidate region, the processor 22 applies an object based segmentation method. Accordingly, a set of image properties of the object is determined. The set of image properties may include properties selected from the group comprising: a statistical moment, a moment invariant feature, a features derived from a grey level co-occurrence matrix, a spectral feature and a morphological feature.

The processor 22 then compares the set of image properties with classification data to classify the object according to what type of tissue structure the object belongs to. This may be performed according to the method of object guided segmentation described with reference to FIG. 6, below.

The classification data can be provided as a knowledge file, stored in the memory 24. The knowledge file stores an association between image properties, and tissue types to enable regions of an image to be classified based on image properties. In one example a knowledge file comprises a file that stores the conditions that define a tissue object, structure, tissue type or disease type. Image properties may be selected from the list comprising object size, shape, color, density, contextual data, and textural data.

The classification data may also comprise contextual features of the image data, for example the spacing and/or orientation of objects of an identified type relative to other objects. As another example the classification data may comprise a sequence of object types, and the processor may be configured to identify an object based on this classification data, and the types and locations of other objects in the image.

The processor then selects 2010 parts of the candidate region for further analysis, for example at a higher resolution, and selects 2012 a data model for that type of tissue structure from the classification data, and compares 2014 the model with objects in regions of the image adjacent to the candidate region. This enables similar objects in adjacent image regions to be more efficiently identified. In addition, this enables objects which span adjacent tiles of the image to be more fully represented. This localised search and classification process may be repeated at incrementally higher resolutions to refine the estimate of the size and location of tumor type tissues in the image.

The processor 22 then reconstructs 2016, a version of the original image based on the location and size of the identified objects. This provides a map of the tissue indicating the tumor and non-tumor regions from which the relative areas of these regions can be determined.

The processor then obtains an estimate of the size of tissue cells, and the size of tumor cells. This estimate may be selected from memory based on knowledge of the tissue type, or it may be input by a user, or determined based on cell segmentation of the image at native resolution. One possibility is that the estimate of tumor cell size is based on sampling selected regions of the image of the tissue, for example at a higher resolution than is used for the object classification. Counting cells in these selected regions then enables an estimate of the size of a tumor cell to be determined. These regions may be selected at random, for example in a monte-carlo type fashion from the regions of the image identified in the lower resolution data (e.g. used for object classification) as being related to tumor tissue. The estimates based on this sampling of a subset of the tumor tissue can then be applied to the entire tumor area. An analogous approach may be used to estimate the area of non-tumor cells.

The processor then determines 2018 the quantity of tumor cells in the tissue sample based on the total area of the tumor objects, and the estimated size of a tumor cell. The processor also determines the quantity of non-tumor cells in the tissue sample based on the total area of non-tumor tissue, and the estimated area of a non-tumor cell. This enables the estimate of a percentage of the tumor vs. non-tumor cells in the sample.

Whilst this method has been described in specific terms it will be appreciated that many variations of the approach described here may be applied.

For example, the threshold used to provide the mask can also be predefined rather than being based on the variance of the data values within each group. In some possibilities the threshold may be selected based on user input, for example the processor may be configured to determine the threshold (e.g. based on intra-group variances) and then to adjust the threshold based on input from a user.

Segmentation may be performed to provide a mask at each of a plurality of resolution levels, or segmentation may be performed at one resolution (e.g. the native resolution of the images) and then up-sampled or down-sampled (e.g. by smoothing) to provide masks at different resolutions.

The image data for each tile may comprise image data relating to that tile at at least one resolution. Where different resolutions are used these may be provided by images collected at differing levels of magnification. In some possibilities images at different resolutions may be obtained by downsampling (e.g. smoothing). This approach may be used in combination with differing magnification levels.

Image tiles of the same image region having different resolutions described above may comprise the same number of pixels, or a different number of pixels covering the same spatial region of the image. Different classification data may be applied to the image data relating to different resolutions.

The processor subset of the stored classification data may be selected at random, for example in a Monte-Carlo type approach. In some possibilities, selecting may comprise selecting a predefined, or user selected, subset of classification data. In one possibility the classification data comprises data (e.g. feature vectors) relating to known tissue types and/or known tumor types, and selecting the subset of classification data may comprise selecting classification data based on the tissue type of the sample from which the imaged section of tissue was derived.

The classification data may be derived from a supervised learning model in which the classification data comprises a feature vector derived from an image of a tissue sample, and an indication of whether that feature vector relates to tumor or non-tumor image data. The processor may be configured to obtain input from a user confirming whether a region of the image comprises tumor tissue and to store one or more feature vectors from that region of the image in memory with the classification data. This may enable the operation of the method to be adapted or tuned to operation in particular types of tissue.

Figure 5:
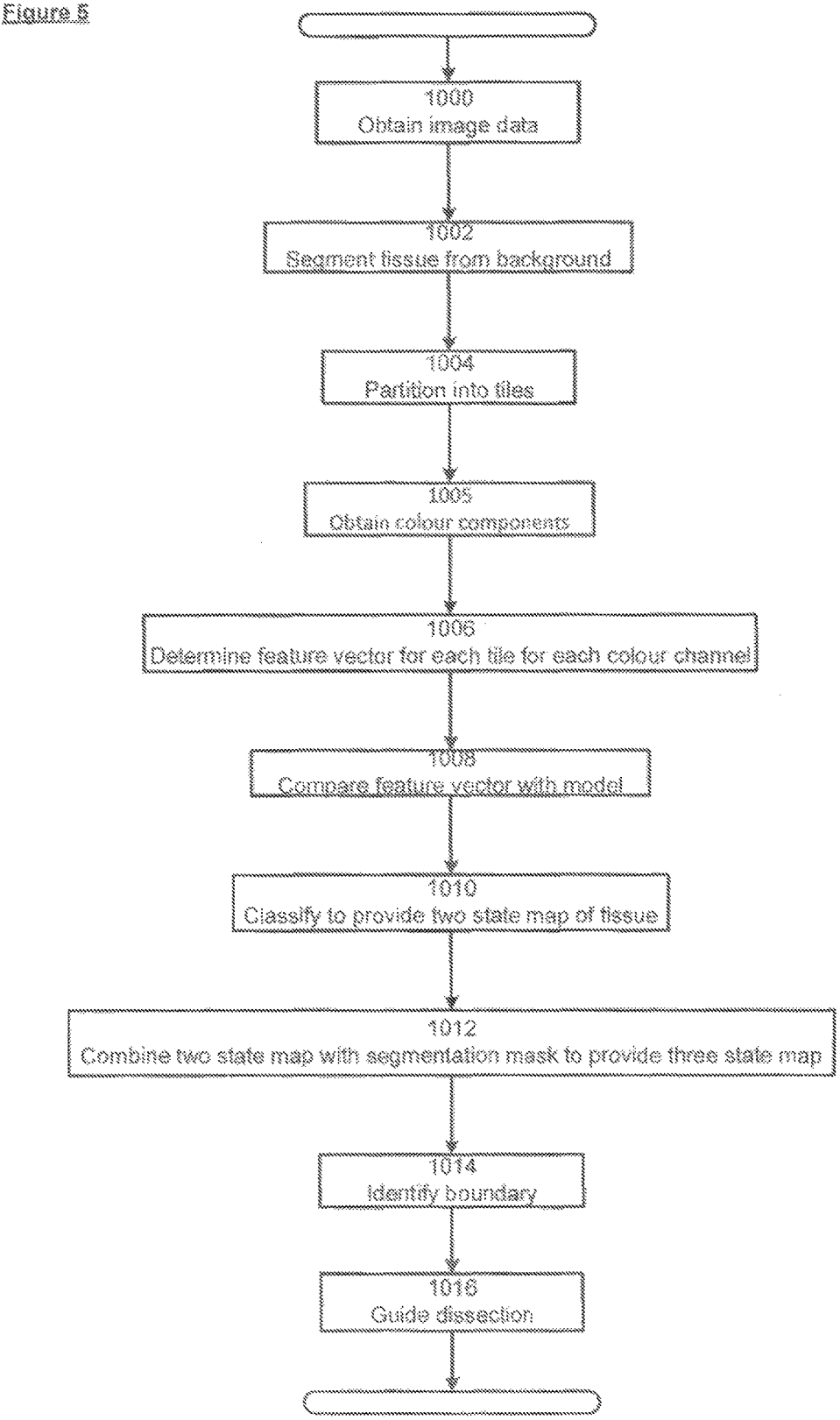
FIG. 5 illustrates a method of defining a boundary of a region such as may be used with any other method described herein.

FIG. 5 shows a flow chart illustrating a computer implemented method of processing an image to obtain a boundary of an object in the image, these boundaries may be used in the identification of objects (for example based on their shape), and may also be used as a guide to dissection of a tissue sample suspected of comprising tumor.

The processor 22 obtains 1000 from memory 24 an image of a section through the tissue sample. The section can be imaged from a microscope slide stained using Haemotoxylin and Eosin.

The processor obtains 1001 a first component of the image data corresponding to the Eosin stain.

The processor PPP then selects a threshold to apply to the first component of the image data that divides the eosin image data into two groups. The processor is configured to select a threshold that reduces, for example minimises, the variance of the data values within each group. The processor 1000 then applies the threshold value to the first component of the image data to generate a mask.

The processor then applies the mask generated from the first component to segment 1002 the image data into two groups. Image data in the first group is identified as tissue, and image data in the second group is identified as background.

The processor then partitions 1004 the first group of image data, relating to tissue, into tiles. The image data for each tile comprises image data relating to that tile at a series of different resolutions The data for the tile at each different resolution comprises a plurality of blocks each representing at least a portion of the tile at a different effective magnification. Different magnifications may be achieved by providing equivalent pixel numbers for different sized spatial regions, or a different number of pixels for equally sized spatial regions.

For each tile, at each resolution level, the processor obtains 1005 three components of the image data, a first component corresponding to the Eosin stain, a second component corresponding to the Haemotoxylin stain, and a third grey scale component. The first and second components may be obtained by applying a color deconvolution method to the image data. The grey scale image data comprises a greyscale version of the image data in the tile.

For each color component of the tile, the processor selects at least one property to be determined based on the color component image data in the tile. The properties to be determined are selected based on the color component so different properties can be determined for different color components. The properties are selected from the list comprising texture, statistical moments, such as centroids, averages, variances, higher order moments, moment invariant, frequency domain features, features derived from the grey level co-occurrence matrix, and morphological features, such as average nuclear size and/or shape, nuclear concentration in a spatial region, and high level spatial relationships between image objects, which may be derived from Delaunay Triangulation, Voronoi diagram and/or a minimal expanding tree algorithm which treats each cell nucleus as a vertex.

The processor then determines 1006 the selected image properties for each of the three components of the tile, and concatenates the image properties together to provide a feature vector.

The processor then obtains from memory a subset of the stored classification data. The classification data comprises a first set of model image feature vectors associated with tumor tissues, and a second set of model image feature vectors associated with non-tumor tissue.

The processor selects from amongst the first plurality of feature vectors (tumor type) from the classification data, and the second plurality of feature vectors (non-tumor type) from the classification data to provide a subset (e.g. less than all of the set). This provides a subset of model feature vectors.

The processor then compares 1008 the concatenated feature vector from the tile with the selected subset of the classification data, and based on the comparison, the processor classify 1010 the tile as belonging to one of two states—tumor or non-tumor.

The processor is configured to combine 1012 the tiles to provide a two state map (e.g. binary) identifying tumor, and non-tumor regions of the tissue with the tissue/non-tissue mask generated by the segmentation 1002 to provide a spatial map of the image data which classifies regions of the image into one of three states e.g. background, tumor tissue, and non-tumor tissue.

The processor is further configured to identify 1014 a boundary between regions in the three state map The processor is configured to identify an initial boundary based on an edge detection algorithm, encode the resulting boundary, and smooth the boundary by reducing the contribution of high spatial frequency components to the boundary.

The processor then obtains a probability estimate based on comparing the feature vectors of tiles in tissue regions of the image with the selected subset of model image data to assign a probability to each tile.

The processor can then display the resulting probability estimate as a color map, overlaid with the smoothed boundary data, to provide a user with an estimate of the location of tumor and non-tumor regions in the image.

FIG. 6 illustrates a computer implemented method of object based segmentation which may be used to identify tissue structures, such as glands, in images of tissue. This method may be employed to identify structures and objects in any one of the methods described herein.

A system such as that illustrated in FIG. 1 may be operated according to the method illustrated in FIG. 6.

As noted above, the memory 24 of FIG. 1 may store classification data comprising a knowledge file. The knowledge file may comprise stored images of known structures, and/or data describing those structures, for example the knowledge file may comprise one or more feature vectors associated with each known structure.

The knowledge file may comprise image data for each of a plurality of known structures so that, by comparing a test image with image data from the knowledge file, a structure can be identified. The knowledge file may also indicate relationships between known structures. For example, the knowledge file may indicate that, where a particular type of structure is identified in a tissue, it is likely that other associated structures may also be present in the surrounding tissue.

As shown in FIG. 6, the processor obtains 4000 image data, for example by retrieving the image data from memory or receiving the image data from an imager 50. The processor divides 4002 the image data into tiles.

The processor 22 applies 4004 a threshold to the image data, and selects 4006 a supra threshold region.

The processor 22 compares 4008 the selected supra threshold region with an item of stored classification data, this comparison may generate 4010 a numerical score indicating the degree of similarity between the supra threshold region and that item of classification data. The numerical score may be, for example, a confidence interval, or a score based on a merit function. The items of classification data may be obtained from a knowledge file stored in memory 24.

The processor then determines 4012 whether the comparisons are complete. The processor may determine that the comparisons are complete when the supra threshold region has been compared with all of the items of classification data. In some examples the processor may determine that the comparisons are complete when an item of classification data is found that matches the supra threshold region (e.g. provides a merit function value, or a confidence interval, within a selected range).

In the event that the comparisons indicate that the supra threshold region matches an item of stored classification data, the processor retrieves 4014 data describing the tissue structure associated with that item of classification data.

For example, a stored classifier image may be associated with an example of a particular tissue structure, such as a gland, and data indicating whether that example of the particular tissue structure is cancerous or normal.

The data associated with the matching item of classification data image may also include data indicating structures which can be expected to be found near to the structure identified by that item of classification data. For example, this may comprise additional images showing the shape of the parts of the tissue structure, and/or the shapes of structures expected to be found nearby, and/or feature vectors for those structures.

The processor is therefore able to select 4016 a subset of the items of classification data (e.g. less than all of the total set stored in memory), and to begin the comparisons of the next supra threshold structure by using that subset. The processor 22 then determines 4018 whether or not all of the supra threshold regions in the current image tile have been compared with the classification data. If other supra threshold regions remain to be identified in the tile, the processor 22 compares 4006 those selected supra threshold regions with at least one item of classification data of the subset identified at step 4016 before comparing the supra threshold region with items of classification data other than those in the subset. By this approach efficiency may be improved because, if a supra threshold structure matches part of a known type of structure, the image data around that supra threshold structure can be compared with data associated with that known tissue structure.

If all the supra threshold regions in the current tile have been compared with the classification data, the processor then selects the next tile for analysis. If a structure has been identified in the tile, the processor determines 4020 whether that structure lies along a boundary of a tile. In the event that the structure does lie along a boundary of a tile, the processor selects 4022 the tile adjacent to that boundary and analyses that tile next (e.g. according to the thresholding, and comparing steps described above). In the event that a structure has not been identified as lying on a boundary the next tile may be selected 4024 based on a sequence, or a predefined rule.

Embodiments of the disclosure described with reference to FIG. 6 may enable comparisons performed in a selected tile to be informed by the classification of the structure(s) identified in that tile, or in an adjacent tile. For example, the knowledge file for a particular structure may include images, and data, describing structures which are likely to be found around that particular structure. Therefore, when trying to classify tissue structures in adjacent tiles, the classification can begin by trying to identify structures which are known to be likely to be found in that area.

The method described with reference to FIG. 6 may be performed at a number of different resolutions, and the lower resolution data may be treated before data at relatively higher resolution. Regions, for example tiles, of relatively higher resolution image data may be selected based on the identification of a structure in the lower resolution image data. In addition, the method described with reference to FIG. 6 may be applied to one or more color components of the image data such as the Haemotoxylin and Eosin color component.

Numerous variations and alternatives to the embodiments described herein will be apparent to the skilled reader in the context of the present disclosure. For example, in FIG. 1, the computer 20 is represented as a desk-top PC. It will be appreciated that any other type of computer or server could be used.

The processor 22 of FIG. 1 may be a standard computer processor, but it will be understood that the processor could be implemented in hardware, software, film ware or any combination thereof as appropriate for implementing the image processing method described herein.

The memory 24 of the computer 20 of FIG. 1 may be configured to store data received from the imager 50, results generated by the processor 22, and classification data for classifying tumor and non-tumor regions. Non-volatile memory may be provided for storing the classification data. Further non-volatile memory may be provided for storing the image data so that the image data for a plurality of tissue samples may be uploaded and stored in memory until such time as the processor 22 has capability or an instruction to process it. The memory 24 may comprise a buffer or an on-chip cache. Further non-volatile memory may be provided for storing results of the image processing method for later user reference and/or for updating the classification data using a learning method.

Tumor regions, such as the tumor schematically illustrated by region 6 of FIG. 1, are tissue regions containing abnormal patterns of growth, which may include, but are not limited to, any of dysplasia, neoplasia, carcinoma in-situ and cancerous tissue or any combination thereof. The non-tumor regions 8 may also contain tumor tissue, but in a lower concentration than present in their tumor regions 6, as will be understood by those skilled in the art. The tissue block may be a formalin fixed, paraffin embedded tissue block, or a tissue block prepared in any other suitable way.

The imager 50 may comprise any suitable image generating means, including, but not limited to, an analogue or digital camera and a digital slide scanning system, in which an image is reconstructed following acquisition of image tiles or raster lines.

Obtaining the image data may comprise retrieving it from non-volatile memory, or from RAM, or from an on chip-cache, ADC or buffer. The image data in memory may be derived from data stored elsewhere in the apparatus, or received over a communications link such as a network, or obtained from an imager such as a microscope.

The section of tissue can be stained using Haemotoxylin and Eosin, or with any other appropriate histological stain. The description above makes reference to separating the image data into components corresponding to the particular stains. As will be appreciated, other colored stains may be used, and the image data may be separated into components corresponding to the stains used. The components may comprise color channels, which may be separated using a color deconvolution method. However, other types of color component, separated by other kinds of methods may also be used.

Obtaining 1001 the first component corresponding to the eosin stain may comprise obtaining the intensity of eosin stain using color deconvolution method. The second component corresponding to the Haemotoxylin stain may be similarly obtained.

The segmentation by masking may be based on a single component of the image data, such as the first (eosin) component as described above, or from one of the other components, or from the original image data, or from a combination of one or more of these. In some examples a predefined image mask may be used.

The threshold used to provide the mask can also be predefined rather than being based on the variance of the data values within each group. In some possibilities the threshold may be selected based on user input, for example the processor may be configured to determine the threshold (e.g. based on intra-group variances) and then to adjust the threshold based on input from a user.

Segmentation may be performed to provide a mask at each of a plurality of resolution levels, or segmentation may be performed at one resolution (e.g. the native resolution of the images) and then up-sampled or down-sampled (e.g. by smoothing) to provide masks at different resolutions.

The image data for each tile may comprise image data relating to that tile at at least one resolution. Where different resolutions are used these may be provided by images collected at differing levels of magnification, for example as described in relation to FIG. 3. In some possibilities, images at different resolutions for a given tile may be obtained by downsampling, e.g. smoothing, or by image interpolation. This approach may be used in combination with differing magnification levels.

Image tiles of the same image region having different resolutions described above may comprise the same number of pixels, or a different number of pixels covering the same spatial region of the image. Different classification data may be applied to the image data relating to different resolutions.

In one possibility, for each tile, at each resolution level, the processor obtains 1005 three color components, one corresponding to an eosin color channel and another corresponding to a Haemotoxylin color channel as obtained using a color decomposition method, as well as one grey scale color channel obtained directly from the original RGB colored image. The processor then continues to step 1006 of the method as described above.

At or following the classification step 1010, tiles classified as representing tumor regions may be assigned a posterior probability of corresponding to a tumor region of the tissue sample, based on a selected threshold level. For example, when classifying the tile as tumor or non-tumor, a threshold level of 0.5 (50%) may be applied.

The probability estimate used to generate the color map be obtained by updating the posterior probability data.

It will be appreciated by the skilled addressee in the context of the present disclosure that the disclosure provides systems, methods, apparatus, computer program products and servers for processing an image of a tissue section of a tissue sample to analyse and identify a tumor region of a tissue sample for the purpose of macrodissection of the tissue sample. As already provided, a tumor may contain patterns of cell growth which contain, but are not limited to, any of dysplasia, neoplasia, carcinoma in-situ and cancerous tissue, or any combination thereof. It will be appreciated by the skilled addressee in the context of the present disclosure that the disclosure could equally apply to other diseases which are capable of morphological identification.

In some examples the functionality of the computer and/or the processor may be provided by digital logic, such as field programmable gate arrays, FPGA, application specific integrated circuits, ASIC, a digital signal processor, DSP, or by software loaded into a programmable processor. The functionality of the processor and its programs may be provided in a single integrated unit, or it may be distributed between a number of processors, which may be arranged to communicate over a network, such as "cloud" computing. This may enable, for example, the processing steps of the method to be performed at a device (or devices) that are remote from the image capture and the tissue sample apparatus.

In some embodiments contextual information may be part of the knowledge file. The knowledge file may contain data to enable objects and/or regions and/or disease variants to be classified within a tissue sample. This may include the relationship (e.g. a spatial relationship) between objects, this may provide contextual characteristics of the objects.

A knowledge file may define object features (e.g. size, shape, texture, etc.) and contextual features (e.g. proximity to other objects, Delauney triangulation data, etc.) to allow the image to be reconstructed into morphological objects, tissue structures and tissue classifications. The may enable "image understanding", e.g. getting the computer system to understand what is being identified and use this to better identify objects which constitute cancer.

In some embodiments estimating an amount of tumor cells comprises estimating a number of tumor cells which can then be used to determine a percentage of tissue that has tumor cells.

Many different methods may be used to identify tumor cells in microscope image data.

Figure 7:
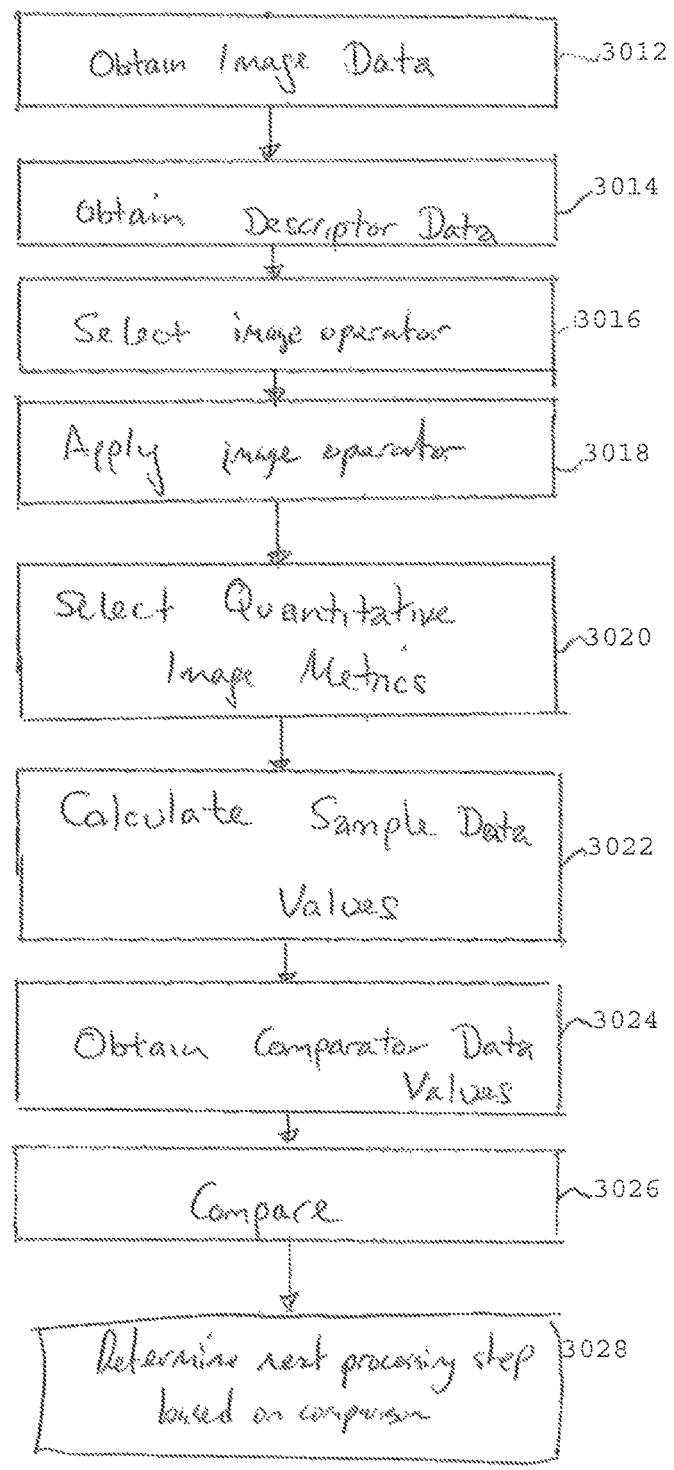
FIG. 7 illustrates a method which may be used to identify types of cells in microscope image data.

FIG. 7 illustrates one such computer implemented method. In this method, the computer first obtains 3012 microscope image data for analysis. This microscope image data may comprise whole slide images. The image data often defines a microscope slide image of a haematoxylin and eosin stained tissue sample, but the slides may also be stained using saffron (as in HES staining). The data itself may be obtained from data storage in the computer's memory and/or may be received over a network. This data may also be obtained from a tissue sample by a microscope imaging system as part of the method and communicated directly to the computer. The image data may originate from a whole slide imaging system.

The memory of the computer comprises an association, such as a look up table, which links a plurality of items of descriptor data to a corresponding plurality of sets of quantitative image metrics. Each item of descriptor data comprises a machine readable identifier of a tissue type. The association links each item of descriptor data to a set (or sets) of quantitative image metrics associated with that tissue type. This enables the correct image metrics to be retrieved from memory for the analysis of any given tissue type (as identified by the descriptor data). Each item of descriptor data is also associated with at least one corresponding set of comparator data values. Each set of comparator data values indicate the values of quantitative image metrics obtained from a tissue structure known (or expected) to be found in the type of tissue identified by the corresponding descriptor.

For example, the descriptor data may identify tissue types such as breast tissue, prostate tissue, lung tissue, pancreatic tissue and other types of tissue. It will be appreciated in the context of the present disclosure that each of these tissue types may comprise different types of structures. Accordingly, more than one comparator data set is generally associated with each descriptor. Each of these comparator data sets describes a different tissue structure known (or expected) to exist in that tissue type.

It will therefore be appreciated that each descriptor is associated in the computer memory with (a) a set of quantitative image metrics and (b) sets of comparator data values of those image metrics where each set of comparator values describes a different structure in that tissue type. For example, the descriptor for breast tissue may be associated with a set of quantitative image metrics, and corresponding comparator data values of those metrics for each of: fat tissue, blood vessels, ducts, lobules, LCIS (lobular carcinoma in situ), DCIS (ductal carcinoma in situ), and perhaps one or more other types of tumor.

This can enable particular structures in particular tissue types to be identified by (1) calculating the relevant image metrics and (2) comparing those metrics with the comparator data values to find a match. This can enable distinctions to be drawn between different structures in a particular tissue type. The comparator data may, dependent upon the tissue type identified by the descriptor data, include comparator data for one or more of: necrosis, inflammatory cells, mitoses, lobules, other anatomical structures, PIN (prostatic intraepithelial neoplasia), colorectal dysplasia, invasive cancer and one or more other types of tumor. A further distinction may be drawn between pre-cancerous cells and cancerous cells, and pre-cancerous cells may, for instance, the computer memory may store different comparator data to be used to identify pre-cancerous cells than is used for the identification of cancerous cells.

Each of these comparator sets comprises data values for a set of quantitative image metrics. For example, these may include one or more items selected from the following list: cell nuclear area ($\mu m^2$), nuclear shape factors (e.g. ratio of nuclear area to perimeter length), cell area ($\mu m^2$), cell shape factors such as ratio of cell area to cell perimeter length, numbers of identified cell populations, cell density (based upon the relative number of objects per unit area), optical density, the grey values of RGB deconvoluted channels, nuclear texture features, glandular area ($\mu m^2$), glandular shape, nuclear stratification, Delauney triangulation metrics, and/or the number of specific tissue objects in the image for the or each corresponding comparator tissue structure.

The descriptor data is then obtained 3014 by the computer, for example it may be provided with the microscope image data or it may be stored in memory with that image data.

Then, the descriptor data is used to select 3016, from data storage in the computer memory, an image operator which may be configured to identify image data having selected spatial characteristics, for example a spatial length scale in a selected range. Examples of image operators include spatial filters and feature extraction operators such as morphological filters (examples of which are set out in greater detail below). Examples of spatial filters include frequency domain operators such as spatial band pass filters, for example low pass filters, for example a Gaussian filter. It will be appreciated in the context of the present disclosure that such operators may be applied in the frequency domain, for example by transforming the image data into the frequency domain, applying the operator, and then transforming the filtered image data back into the image domain. Examples of spatial filters also include image kernels, such as smoothing kernels, which may be applied in the image domain.

The image operator is selected 3016 by the computer, based upon the descriptor data, and based on the type of structure within the tissue type associated with that descriptor which is to be identified first. For example, a plurality of image operators may be stored in memory associated with each item of descriptor data. Each of these image operators may be configured to enhance image regions having length scale/shape characteristics that correspond to structures known (or expected) to be found in that tissue type.

Some examples of image operator may be configured to identify features of a particular size, e.g. those which vary on a spatial length scale which falls within a selected range. This length scale may be chosen based upon the type of structure which is to be identified (e.g. a duct or lobule in the context of breast tissue) or based on the type of cells in the tissue type as identified by the descriptor data.

One example of an image operator which may be used for this purpose is a morphological filter. The size and shape of the structuring element of such a morphological filter may be selected based upon the descriptor data. For example, each item of descriptor data may be associated with one or more different morphological filters. The morphological filter may be configured to provide an erosion operation, a dilation operation, or may include a combination of erosion and dilation operations—such as an 'opening' operation, which is an erosion operation followed by a dilation operation, or a 'closing' operation, which is a dilation operation followed by an erosion operation. The use of such image operators and operations may enable the resolution and identification of key tissue structures that may exist in a tissue sample. Further, it may also provide a series of metrics that may be used to identify the different tissue and cell structures. These may in turn be used to differentiate different pathologies in tissue samples. These pathologies may include tumors or abnormal cells which may, for example, be benign, precancer, and/or cancer cells. By way of example, if breast cancer is present, the cell nuclei may be much larger, irregular, and more dense. Further, low-grade DCIS may exhibit rounded, regular to mildly-irregular nuclei up to around two or three times the size of a red blood cell. High-grade DCIS may exhibit irregularly-shaped nuclei which may be at least three times the size of a red blood cell. DCIS patterns may include 'cribiform', 'macrocapillary', and/or 'solid', and it is possible to describe all of these patterns quantitatively and/or numerically.

Whichever image operator is chosen, the computer then applies 3018 the image operator to the microscope image data to obtain filtered image data. This may comprise iterating over image data stored in memory by application of a multiplicative and/or additive image kernel to the image data e.g. in a stepwise fashion until all, or a selected part, of the image data had been filtered. The output from this process, the filtered image data, can be stored in a new memory location. This filtered image data may comprise regions in which the image intensity has been reduced because the structures in that region of the image do not have the spatial characteristics selected by the image operator. Accordingly, by subsequent application of an intensity threshold to the filtered image data a number of discrete spatial regions of the microscope image data can be identified (e.g. those that survive application of the threshold). These discrete spatial regions may have spatial characteristics (e.g. size and/or shape) that, in the context of that tissue type (as identified by the descriptor data), might imply that they could be to one or more possible candidate structures. For instance, a first image operator may comprise a morphological filter having a structuring element adapted to select structures of a size and shape corresponding to a candidate structure such as a breast tissue duct, or ductal carcinoma in situ, and to suppress other structures. It will be appreciated that references to ducts and DCIS are merely an example, and different image operators may be applied to identify different tissue structures such as fat tissue, blood vessels, stromal cells, epithelium, glands, ducts, lobules, tumor patterns and one or more types of tumor. It will also be appreciated that the image operator may itself comprise a series of component operators—for example a first component operator may comprise a morphological filter configured to identify and bridge together (e.g. to merge) contiguous image regions which comprise epithelial cells; a second component operator may compare the size and/or shape of the bridged contiguous image regions with size and shape ranges for selected known structures such as ducts. In these embodiments, the filtered image data may comprise the regions of the image which match these selected known structures, other non-matching regions of image data may be excluded from the filtered image data.

After application of the first image operator the computer then selects 3020 a relevant set of quantitative image metrics from memory—e.g. based on the descriptor data, and the size/shape characteristics of the first image operator. This set of quantitative image metrics comprises metrics for structures of that size/shape known (or expected) to be found in that tissue type. This set of quantitative image metrics may include one or more items selected from the list comprising: a frequency domain metric, a texture metric, a Gray-Level Co-Occurrence Matrix ('GLCM') metric, an optical density, a color, or any other suitable metric. These metrics may be used to determine a signature, rather in the manner of a fingerprint, for the or each discrete spatial region.

The set of quantitative image metrics may comprise a metric that is based upon an optical density in the or each discrete region. As will be appreciated in the context of the present disclosure, optical density describes the transmission of light through the or each discrete region, and may be defined as the negative of the logarithm (base 10) of the fraction of incident light that is transmitted through a sample, e.g. where the transmission varies between 0 and 1. By comparison with comparator data values, the level of the transmission of the light (and therefore the optical density) of the or each discrete region may be used to obtain information regarding the content of the or each discrete region.

The set of quantitative image metrics may comprise a metric that is based upon spatial frequency data in a selected range of spatial frequencies in the or each discrete region. Spatial frequency data may be obtained by performing a frequency transform (such as a Laplace or Fourier type transform, for example a DFT, for example an FFT, for example a DCT). The resultant spatial frequency data may be used to identify spatial frequencies present in the image data in the or each discrete region. This spatial frequency data can then in turn be used to obtain information regarding the content of the or each discrete region by comparing the spatial frequency data values obtained from the or each region with comparator data values associated with the tissue type (as identified by the descriptor data). The inventors in the present case have appreciated that, whilst normal cells and cancerous cells may show relatively subtle differences in their geometric structures in the spatial domain, these relatively subtle differences may be more effectively measured in the frequency domain, in which more precise measurements can be extracted to characterise different tissue patterns. Furthermore, frequency domain analysis of the image may enable information which is not visible in the spatial domain to be detected, providing more effective and accurate image analysis.

The set of quantitative image metrics may comprise a metric that is based upon the texture of the or each discrete region may be analysed, so as detect particular characteristics that may appear, and/or such that repeating patterns or otherwise may be detected. By way of example, Haralick texture features and/or co-occurrence matrices may be used to analyse the texture of the or each discrete region to be analysed. It is to be understood, however, that any suitable method may be used to quantitatively describe the underlying tissue pattern in the or each discrete region.

The computer then calculates 3022, for each discrete spatial region, at least one sample data value, by applying the quantitative image metrics to the image data in said discrete spatial region. The set of quantitative image metrics may include one metric, such as those identified above, or indeed may include more than one metric. The or each quantitative image metric may be applied in parallel, or in a predefined sequence, or they may be applied in a hierarchical (pattern driven) nature.

The computer uses 3024 the descriptor data to obtain the set of (or sets of) comparator data values (e.g. values of these quantitative image metrics) from the computer memory. For example the computer memory may comprise a look-up table or other memory reference structure which enables the selection of the comparator data values, using the descriptor data as an index. The comparator set may include comparator data values for known comparator structures. Such structures may, for example, include a carcinoma-in-situ a gland, a duct, a lobule, fat tissue, or the like, or other artefacts or structures which may be of interest. The comparator data values may have been obtained previously by evaluating the quantitative image metrics in samples of tissue known to contain one of these known comparator structures.

The computer then compares 3026 the data values obtained from the sample image to at least one of these sets of comparator data values. These comparator data sets may define a number of features which may, for instance, include different tolerance ranges. If the data values obtained from the sample image fall within this tolerance range or set of tolerance ranges, the sample data may then be classified as matching the comparator data structure associated with that data set. This comparison may be achieved using by simple numeric comparison of each metric against the model in the comparator data set. Alternatively or in combination, it may also be carried out in a multivariate setting, and/or a similarity index for example a Jaccard coefficient and/or Euclidean distance may be calculated.

In the event that the sample data values match comparator data values from a known type of structure in the tissue type, the region from which those sample data values were calculated is identified as being that type of structure. Based upon the above operations, some parts of the sample image data may be identified as belonging to one or more of the tissue structures described by the comparator sets. One or more of these comparator sets may correspond to tissue types which are known to look similar to certain types of cancer, or to be pre-cancerous. Examples of such tissue structures include LCIS and DCIS in breast tissue, but other such examples exist. In the event that the computer identifies one of these selected types of tissue in one or more of the discrete spatial regions, the computer may then determine 3028 whether to analyse the or each discrete spatial region further.

Those discrete spatial regions which are determined 3028 as to be analysed further may have subsequent processing steps applied thereto. Those discrete spatial regions which are not to be analysed further may be excluded from subsequent analysis of the image data. This can enable high resolution, or computationally intensive identification algorithms to be applied only to image data which is not amenable to unambiguous identification by less computationally intensive approaches.

Figure 8:
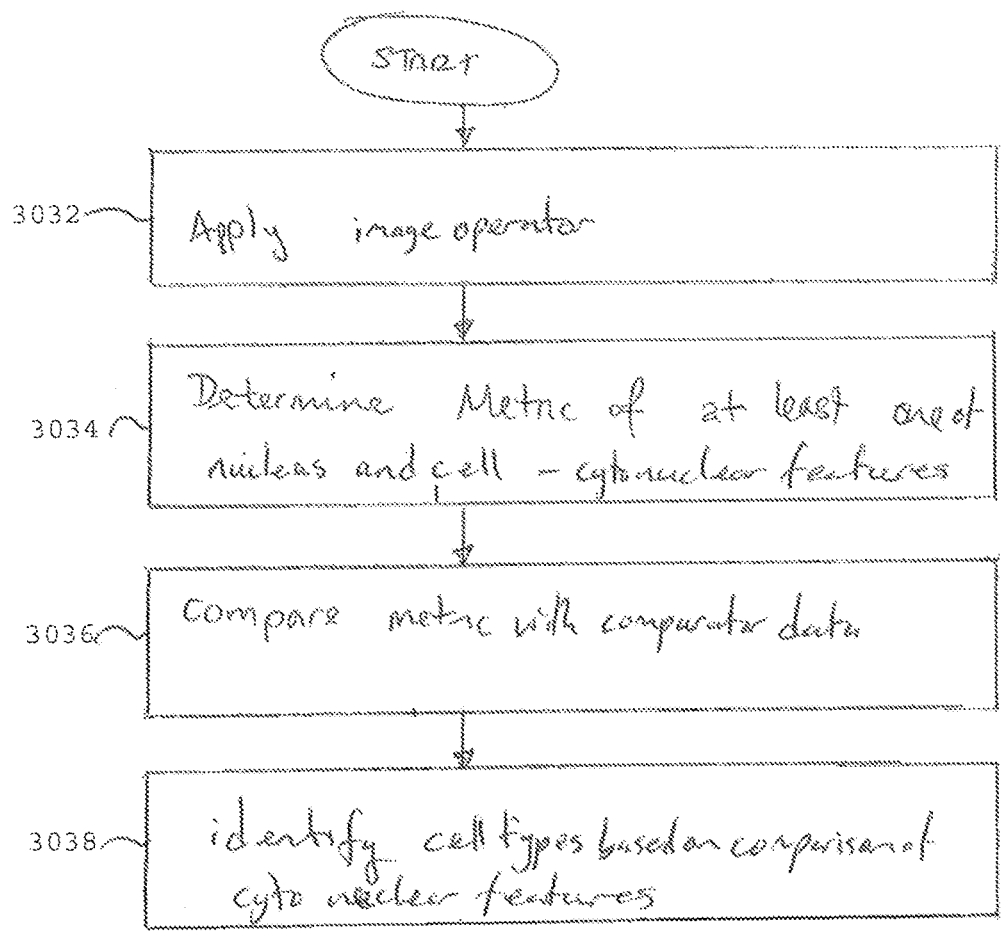
FIG. 8 illustrates another method.

FIG. 8 shows further method steps which may also be employed to analyse these discrete spatial regions further. This method of analysis may be directed specifically to the identification of cytonuclear features—that is to say features related to the size and shape characteristics of cell nuclei, and cell boundaries (e.g. the cell membrane).

In the method illustrated in FIG. 8, the computer applies 3032 a further image operator to the image data in each discrete spatial region identified as being desirable for further analysis. This further image operator may comprise a morphological filter having a structuring element configured to identify cell nuclei—for example it may have a structuring element having a shape selected to identify cell nuclei—e.g. the structuring element may be rounded, for example elliptical, for example circular. The application of this further image operator may provide further filtered image data. As described above, this may be done by the iteratively applying an image kernel (such as the structuring element of a morphological filter) to groups of pixels of the image data. The output data from this process may be stored in a new memory location. The size of the structuring element may be selected to identify cell nuclei, for example it may have a width of less than 20 micron, for example less than 10 micron. The specific shape and size of this structuring element may be based upon the descriptor data. For example it may be based on size and shape characteristics of types of cell nuclei known (or expected) to be present in the image data identified by that descriptor. The selection may also be based on the structure associated with the comparator data found to match the or each discrete region in the method described above with reference to FIG. 7. It will be appreciated that, although this further image operator is described here as comprising a morphological filter—other image operations may also be used, and this further image operator may itself comprise a series of operations such as spatial filtering, thresholding, and other operations. Although this operation or series of operations may vary widely, in this embodiment, the key requirement is that this further image operator is adapted to provide cell nuclei data identifying the locations of cell nuclei in the image data based on the size and/or shape characteristics of those nuclei.

The computer then determines 3034 the width of the cell nuclei identified by the cell nuclei data. The computer also determines the area occupied by these cell nuclei, and may also determine the length of its boundary. This enables the computer to determine a metric of at least one of: the nuclear shape, its area, its shape factor (e.g. the ratio of its boundary length (or the square of that length) to its area). These metrics are merely examples, and other metrics may be used.

The computer may also use the cell nuclei data to determine a metric of at least one of: a density, a chromatin texture, and nucleoli features. These metrics are merely examples, and other metrics may be used. This metric can then be compared 3036 with comparator data to determine 3038 whether it is likely that the at least one discrete region may comprise cancerous cells. For example—in the event that highly irregular shaped cell nuclei are identified, this may be used as an indication that the tissue in the discrete region analysed may warrant further inspection—for example by a human operator.

In addition, or as an alternative, to the determination step 3034 the computer may also determine the shape and/or size of cell boundaries in the image data. To achieve this, a further image operator configured to identify cell boundaries is applied to the image data. Examples of image operators configured to identify cell boundaries include watershedding algorithms. The output of this further image operator is cell boundary data identifying the locations of cell boundaries. The computer can then use the locations of the cell boundaries in the image data to determine the length of these cell boundaries, and the size of the areas they enclose, amongst other cellular characteristics such as its shape factor.

The computer can then compare 3036 the data, describing the cytonuclear features of the image data obtained by this method, with characteristics (e.g. stored cytoneuclear features) of known tissue types and structures. For example, the computer may store one or more sets of cytonuclear comparator data indicating expected ranges of one or more of: cell area, cell shape factor, the ratio of cell area to nuclear area, nuclear shape factor, and nuclear area. The computer may also store an association between these sets of cytonuclear comparator data and cells found in particular tissue structures such as: healthy tissue structures, and pre-cancerous structures and/or cancerous structures. This may enable the computer to identify 3038 based on this comparison, one or more of the types of cells in the image data.

Furthermore, the computer can apply the method described above to a plurality of images, and to a number of individual regions of those images. In these embodiments the computer stores, in memory, an association between each of the images and/or each of those regions and a score that is based on (a) the descriptor data indicating the tissue type from which the tissue sample originated, and/or (b) the match between those images or regions and the comparator data sets (for example the statistical confidence level of such a match). The computer then selects a sequence in which to present the slide images to a human operator based on that score. The computer may also highlight particular regions of the images based on the score associated with those image regions.

The methods described above may be used to identify the number of tumor and non tumor cells in an area of an image as explained above. In some embodiments, an image may be processed to highlight regions at the boundary of a structure identified as a tumor. For example, the present disclosure provides a computer implemented method comprising: identifying a boundary of a tumor structure in an image; generating a first contour that at least partially surrounds the boundary of the tumor structure and defines a first contour area between the first contour and the boundary; determining an estimate of the number of inflammatory cells in the first contour area; and modifying a display of the image in the first contour area based upon the estimate of the number of inflammatory cells in the first contour area. Depending on the nature of the cell identification approach (e.g. the type of structuring element or image operator used, see above, many different cell types and subtypes. Such cellular subtypes may be identified using a plurality of markers, perhaps including inflammatory cell subtypes. These can be identified using stains and/or fluorochromes to distinguish cellular subtypes to enable positional and contextual information on these cells, and their location relative to the tumor boundary to be determined.

This method may further comprise generating a second contour that at least partially surrounds the first contour and defines a second contour area between the second contour and the first contour; determining an estimate of the number of inflammatory cells in the second contour area; and modifying a display of the image in the second contour area based upon the estimate of the number of inflammatory cells in the second contour area.

This method may further comprise generating a third contour that at least partially surrounds the second contour and defines a third contour area between the third contour and the second contour; determining an estimate of the number of inflammatory cells in the third contour area; and modifying a display of the image in the third contour area based upon the estimate of the number of inflammatory cells in the third contour area.

Modifying the display of any one of the first, second, and third contour areas may comprise changing a color thereof based on the estimate of the number of inflammatory cells. The method may comprise reconstructing an image based on the tumor structure and the first, second, and third contour areas, and displaying a further visual indication of the relative number of inflammatory cells on the image.

The further visual indication may comprise a color map. Identifying the boundary may comprise identifying at least one image property of the image and comparing the image property with classification data to classify a region as a tumor region or a non-tumor region. The at least one image property may comprise one or any combination of image properties from the group comprising: a statistical moment, a moment invariant feature, a features derived from a grey level co-occurrence matrix, a spectral feature or a morphological feature. The method may comprise obtaining data identifying the tissue type, and selecting a subset of the classification data for comparison with objects in the region based on the tissue type.

Determining an estimate of the number of inflammatory cells may include identifying the inflammatory cells based on cell size and/or nuclear size and/or nuclear shape as explained above. The inflammatory cells may also be identified based on the ratio of nuclear size to cell size. These methods may be used to provide a computer implemented method of cancer detection including carrying out the steps of any one of the methods described herein. Such methods may further comprise providing an indication of cancer diagnosis, or a prognostic indication and optionally also providing or selecting a medical intervention based on the indication.

Contours can extend internal to the tumor boundary as well as external to its boundary. This may enable cellular infiltration into the tumor to be measured, as well as the cells surrounding its border. There could be more than three contours and the contours may be of different widths internal and external to the tumor boundary. Nuclear size may be identified using using chromogenic stains and fluorescent markers Some aspects of the disclosure provide an automated method for tumor boundary indication which will accurately depict the tumor region for either manual dissection or for dissection using an automated instrument. Estimates of the relative quantity of tumor tissue within a boundary may be used to determine whether to dissect a tissue sample along that boundary.

In an aspect there is provided a computer implemented method of determining an amount of tumor cells in a tissue sample, the method comprising:
obtaining first image data describing an image of a tissue sample at a first resolution;
obtaining second image data describing the image at a second resolution, wherein the first resolution is lower than the second resolution;
    selecting a candidate tumor region from the second image data based on texture data determined from the first image data;
    identifying a tumor structure in the candidate region of the second image data; determining a number of cells in the tumor structure and a cancerous tissue type based on its area and an estimate of tumor cell area to estimate an amount of tumor cells in the tissue sample.

In an embodiment the method comprises obtaining third image data, describing the image at a third resolution, wherein the third resolution is higher than the second resolution, and identifying a tumor structure in the candidate region of the third image data.

In an embodiment the method comprises selecting a subset of image regions corresponding to the identified tumor objects, wherein the subset of image regions is smaller in area than the total area of the tumor objects, and counting cells in the subset of regions to estimate the area of a tumor cell.

In an embodiment selecting a candidate tumor region comprises determining texture data, spatial frequency data, or morphological image data, or another image property, based on the first image data, and comparing the texture data with classification data to identify candidate tumor regions or as non-tumor regions.

In an embodiment determining texture data comprises determining the grey level co-occurrence matrix.

In an embodiment identifying a tumor structure comprises identifying an object in the candidate region, determining at least one property of the object, and comparing the at least one property with classification data. In an embodiment the property of the object comprises a boundary of the object, and/or the shape of the boundary.

In an embodiment the at least one property is one of, or any combination of, image properties selected from the group comprising: a statistical moment, a moment invariant feature, a features derived from a grey level co-occurrence matrix, a spectral feature and a morphological feature.

In an embodiment the method comprises selecting a model of the object based on the classification data, and comparing the model with objects in regions of the image adjacent to the candidate region.

In an embodiment the method comprises comparing the model with objects in regions of the image adjacent to the candidate region comprises identifying objects which span adjacent regions of the image.

In an embodiment the method comprises applying a threshold to the image data to generate a mask adapted to select tissue image data and to discard background data.

In an embodiment the threshold is selected to reduce the variance of at least one of the background data and the tissue data.

In an embodiment the regions comprise tiles of the image selected from the tissue data.

In an embodiment the method comprises obtaining data identifying the tissue type, and selecting a subset of the classification data for comparison with objects in the region based on the tissue type.

In an embodiment the method comprises reconstructing an image based on the identified objects, and their locations.

In an embodiment the classification data is obtained from a knowledge file.

In some embodiments identifying a tumor structure comprises identifying a boundary of the tumor structure. In an embodiment identifying the boundary comprises: identifying at least one image property of a part of the candidate region of the image; and comparing the image property with classification data to classify the part of the candidate region as a tumor region or a non-tumor region; and identifying a boundary of the part of the candidate region of the image.

The at least one image property may comprise one or any combination of image properties from the group comprising: a statistical moment, a moment invariant feature, a features derived from a grey level co-occurrence matrix, a spectral feature or a morphological feature.

In an embodiment the at least one image property comprises at least one image property of each of a plurality of different color components of the image concatenated together to provide a feature vector.

In an embodiment the method comprises applying a smoothing algorithm to the boundary to provide a smoothed template for cutting along the tissue boundary. In an embodiment applying the smoothing algorithm comprises applying a forward frequency-domain transform and an inverse frequency-domain transform. In an embodiment applying the smoothing algorithm comprises representing the image boundary as a sequence of transition indicators indicating the direction of a transition between pixels on the image boundary, and smoothing the sequence of transition indicators.

In an embodiment the method comprises classifying the part of the candidate region based on a comparison between the feature vector and the classification data.

In an embodiment the method comprises reconstructing an image based on the identified objects, and their locations, and displaying a visual indication of the relative number of tumor cells on the image. In an embodiment the visual indication comprises a color map in which the image color is selected based on the relative number of tumor cells on the image.

An aspect of the disclosure provides a computer implemented method of identifying structures in an image of a tissue sample. This method may be used to provide "object guided segmentation" for use in any one of the other methods described herein. This method comprises, applying a threshold to the image, and identifying a first supra threshold region in the image, comparing data describing the first supra threshold region with a plurality of items of stored classification data, selecting, based on the comparing, a first item of the stored classification data, and, based on the selected item of stored classification data, selecting at least one other item of classification data, and comparing a second supra threshold region in the image with the at least one other item of classification data.

The at least one other item of classification data may comprise a subset of items selected from the plurality of items of stored classification data. The method may comprise dividing the image into tiles, and selecting a tile of the image, wherein the first supra threshold region and the second supra threshold region are regions of the same selected tile.

The method may comprise identifying, based on the comparing, a structure in the selected tile, determining whether the structure is adjacent to a boundary of the tile, and in the event that the structure is adjacent a boundary, selecting a second tile from the image adjacent to that boundary. The method may comprise identifying a supra threshold region in the second tile, and comparing data describing that supra threshold region with a plurality of items of stored classification data. The method may also comprise identifying a structure in the image as a tumor structure based on the classification data, and determining a number of cells in the tumor structure based on its area and an estimate of tumor cell area to estimate an amount of tumor cells in the tissue sample.

In an aspect there is provided a computer implemented method of identifying structures in an image of a tissue sample, the method comprising: dividing the image into tiles; applying a threshold to the image, and identifying a supra threshold region in a first tile of the image; comparing data describing the supra threshold region with a plurality of items of stored classification data; identifying, based on the comparing, a structure in the first tile; determining whether the structure is adjacent to a boundary of the first tile, and in the event that the structure is adjacent to a boundary, selecting a second tile from the image adjacent to that boundary.

The method may comprise selecting, based on the comparing, a first item of the stored classification data; based on the selected item of stored classification data, selecting at least one other item of classification data, and comparing a second supra threshold region in the image with the at least one other item of classification data.

As described herein, image data may be obtained using microscope apparatus such as whole slide scanners. It may also be obtained from data stores. Accordingly, an image obtainer may comprises a data communication interface for obtaining microscope image data defining microscope slide images of haematoxylin and eosin stained tissue samples. Examples of data communication interfaces include Ethernet, and serial interfaces such as a universal serial bus interface—other examples of data communication interface maybe used. The apparatus described herein may comprise such an obtainer in addition to or as an alternative to a microscope or microscope interface. Such hardware may be computed to a processor and/or a general purpose computer to permit the methods described herein to be carried out.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

For example in some embodiments the methods described herein comprise applying a morphological filter to the image data in the event that it has been determined that one or more discrete region of that image data is to be further analysed. For example such a morphological filter may only be applied to regions that have been selected to be further analysed. Such a morphological filter may have a structuring element selected to provide cell nuclei data identifying cell nuclei. For example, the structuring element may be circular and may have a diameter of less than 20 micron, for example less than 10 micron. This cell nuclei data may enable it to be determined whether the at least one discrete region comprises cancerous cells. For example such methods may comprise determining a metric of at least one of nuclear shape and nuclear size from the cell nuclei data, and comparing the at least one of nuclear shape and nuclear size with comparator data to determine whether the at least one discrete region comprises cancerous cells. Such methods may further comprise obtaining cell boundary data that identifies cell boundaries in the or each discrete region and/or determining whether the at least one discrete region comprises cancerous cells based on the cell boundary data. For example this may comprise determining at least one of cell shape and cell size from the cell boundary data, and comparing the at least one of cell shape and cell size with comparator data to determine whether the at least one discrete region comprises cancerous cells.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software code, electronic instructions, flash memory, optical disks, CD-ROMs, DVD ROMs, magnetic or optical cards, other types of machine-readable mediums suitable for storing electronic instructions, or any suitable combination thereof.

In some examples the functionality of the computer and/or the processor may be provided by digital logic, such as field programmable gate arrays, FPGA, application specific integrated circuits, ASIC, a digital signal processor, DSP, or by software loaded into a programmable processor. The functionality of the processor and its programs may be provided in a single integrated unit, or it may be distributed between a number of processors, which may be arranged to communicate over a network, such as "cloud" computing. This may enable, for example, the processing steps of the method to be performed at a device (or devices) that are remote from the image capture and the image analysis.

In the context of the present disclosure other examples and variations of the devices and methods described herein will be apparent to a person of skill in the art. Other examples and variations are within the scope of the disclosure, as set out in the appended claims.

Other examples and variations are within the scope of the disclosure, as set out in the appended claims.

The invention claimed is:

1. An apparatus comprising:
   an image obtainer configured to obtain microscope image data and to provide the data to the image processor, wherein the image data defines a microscope slide image of a haematoxylin and eosin stained tissue sample and the microscope slide image data comprises a plurality of image pixels; and
   a processor, for performing operations on the image data, and configured to:
      obtain descriptor data indicating a type of tissue from which the tissue sample originates;
      select, based on the descriptor data, a spatial filter configured to identify structured image data that describes structures having a spatial length scale in a selected range;
      apply the selected filter to the image data to identify a subset of image data that defines a number of discrete spatial regions of the image wherein the discrete spatial regions comprise less than all of the area of the image;
      select, based on the descriptor data, a set of quantitative image metrics;
      determine, for each discrete spatial region, a sample region data value for each of the set of quantitative image metrics based on the subset of image data associated with the or each discrete spatial region,
      obtain at least one comparator set of tissue model data values, wherein each comparator set is associated with a different corresponding comparator tissue structure and each comparator set comprises data values of the set of quantitative image metrics for the corresponding comparator tissue structure;
      compare the sample region data value for each discrete region with the at least one comparator set; and
      wherein the processor is configured so that, in the event that the sample region data value for the or each discrete region matches the comparator set, the processor determines, based on an identity of the corresponding comparator tissue structure, whether to further analyse the or each discrete region.

2. The apparatus of claim 1, wherein the processor is configured to apply a first morphological filter to the image data in the or each discrete region in the event that the or each discrete region is to be further analysed, wherein the morphological filter has a structuring element selected to provide cell nuclei data identifying cell nuclei.

3. The apparatus of claim 2 wherein the structuring element of the first morphological filter is circular and has a diameter of less than 20 micron, for example less than 10 micron.

4. The apparatus of claim 2 wherein the processor is configured to augment the image data based on the cell nuclei data, and to provide the augmented image data to support a diagnosis of the presence of cancerous tissue in the tissue sample.

5. The apparatus of claim 4 wherein the processor is configured to augment the image data based on a metric of at least one of nuclear shape and nuclear size determined from the cell nuclei data.

6. The apparatus of claim 5 wherein the processor is configured to augment the image data based on comparing the at least one of nuclear shape and nuclear size with comparator data to indicate whether the at least one discrete region comprises cancerous cells.

7. The apparatus of claim 6 configured to provide at least one of (a) an augmented image comprising an indication of a result of at least one of said comparing steps and (b) a diagnostic indication of the presence of cancerous cells in the tissue based on a result of at least one of said comparing steps.

8. The apparatus of claim 1 wherein the processor is configured to augment the image data based on cell boundary data that identifies cell boundaries in the or each discrete region.

9. The apparatus of claim 8 wherein the processor is configured to determine the cell boundary data from gradient image data of the or each discrete region, wherein the cell boundary data comprises at least one of cell shape and cell size.

* * * * *